(12) United States Patent
Chung et al.

(10) Patent No.: US 8,821,753 B2
(45) Date of Patent: Sep. 2, 2014

(54) ETCHING SOLUTIONS

(71) Applicant: Inktec Co., Ltd., Ansan (KR)

(72) Inventors: Kwang-Choon Chung, Yongin (KR); Hyun-Nam Cho, Gunpo (KR); Young-Kwan Seo, Siheung (KR)

(73) Assignee: Inktec Co., Ltd., Ansan-si (KR)

( * ) Notice: Subject to any disclaimer, the term of this patent is extended or adjusted under 35 U.S.C. 154(b) by 0 days.

(21) Appl. No.: 13/741,493

(22) Filed: Jan. 15, 2013

(65) Prior Publication Data
US 2013/0126478 A1 May 23, 2013

Related U.S. Application Data

(63) Continuation of application No. 11/910,855, filed as application No. PCT/KR2006/001263 on Apr. 5, 2006, now Pat. No. 8,366,958.

(30) Foreign Application Priority Data

Apr. 6, 2005 (KR) .................. 10-2005-0028508

(51) Int. Cl.
*C09K 13/00* (2006.01)
*C09K 13/06* (2006.01)

(52) U.S. Cl.
USPC ........ 252/79.1; 252/79.2; 252/79.3; 252/79.4; 216/88; 216/89

(58) Field of Classification Search
None
See application file for complete search history.

(56) References Cited

U.S. PATENT DOCUMENTS

| | | | |
|---|---|---|---|
| 3,860,423 A | 1/1975 | Okamoto | |
| 3,905,907 A | 9/1975 | Shiga | |
| 4,542,214 A | 9/1985 | Bechara | |
| 5,137,700 A | 8/1992 | Sloan | |
| 5,676,760 A | 10/1997 | Aoki et al. | |
| 6,468,439 B1 | 10/2002 | Whitehurst et al. | |
| 6,551,935 B1 | 4/2003 | Sinha et al. | |
| 6,971,945 B2 | 12/2005 | Liu et al. | |
| 8,366,958 B2 * | 2/2013 | Chung et al. ............... | 252/79.1 |
| 2005/0178742 A1 | 8/2005 | Chelle et al. | |
| 2008/0277381 A1 * | 11/2008 | Chung et al. ............... | 216/94 |
| 2010/0189901 A1 * | 7/2010 | Chung et al. ............... | 427/256 |

FOREIGN PATENT DOCUMENTS

| | | |
|---|---|---|
| JP | 2002-129259 | 5/2002 |
| JP | 2004-172427 | 6/2004 |
| JP | 2004-176115 | 6/2004 |
| JP | 2004-231982 | 8/2004 |
| JP | 2004-238656 | 8/2004 |
| KR | 1020030079323 A | 10/2003 |
| KR | 1020040047634 A | 6/2004 |
| KR | 1020040048374 A | 6/2004 |
| KR | 1020050011475 A | 1/2005 |
| KR | 1020050011478 A | 1/2005 |
| KR | 1020060097271 A | 9/2006 |
| KR | 1020060101570 A | 9/2006 |

OTHER PUBLICATIONS

Renner, "Silver, Silver Compounds, and Silver Alloys," Ullman's Encyclopedia of Industrial Chemistry, vol. A24, pp. 107-113, (1993).
George et al., "Chemically Reversable Organogels: Aliphatic Amines as 'Latent' Gelators with Carbon Dioxide," J. Am. Chem. Soc., vol. 123, pp. 10393-10394, (2001).
George et al., "Chemically Reversable Organogels via 'Latent' Gelators. Aliphatic Amines with Carbon Dioxide and Their Ammonium Carbamates," Langmuir, vol. 18, pp. 7124-7135, (2002).
George et al., "Primary Alkyl Amines as Latent Gelators and Their Organogel Adducts with Neutral Triatomic Molecules," Langmuir, vol. 19, pp. 1017-1025, (2003).
George et al., "Detection of Pre-Sol Aggregation and Carbon Dioxide Scrambling in Alkylammonium Alkylcarbamate Gelators by Nuclear Magnetic Resonance," Langmuir, vol. 19, pp. 8168-8176, (2003).

* cited by examiner

*Primary Examiner* — Duy Deo
(74) *Attorney, Agent, or Firm* — The Webb Law Firm

(57) ABSTRACT

The present invention provides an etching solution for silver or silver alloy comprising one at least ammonium compound represented by the formula (1), (2) or (3) below and an oxidant:

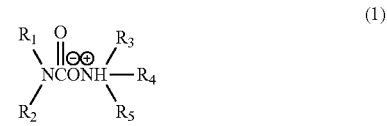

(1)

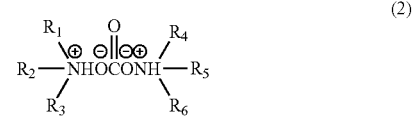

(2)

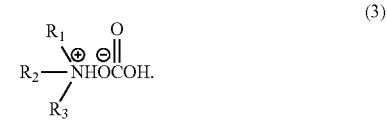

(3)

23 Claims, No Drawings

ETCHING SOLUTIONS

CROSS REFERENCE TO RELATED APPLICATIONS

This application is a continuation of co-pending U.S. patent application Ser. No. 11/910,855, filed Jun. 16, 2008, which is the United States national stage filing under 35 U.S.C. §371 of International Application No. PCT/KR2006/001263, filed Apr. 5, 2006, and which claims priority to Korean Patent Application No. KR 10-2005-0028508, filed Apr. 6, 2005, all of which are incorporated by reference herein in their entirety.

TECHNICAL FIELD

The present invention relates to an etching solution for silver or silver alloy.

BACKGROUND ART

According to *Ullmann's Encyclopedia of Ind. Chem.*, Vol. A24, 107(1993), silver is a precious metal resistant to oxidation, having good electrical and thermal conductivity, and having catalytic and antimicrobial activity. Therefore, silver and silver compounds are widely used in industries, including alloy, plating, medicine, photography, electrics/electronics, fiber, detergent and household appliances. In addition, silver compounds can be used as catalyst in the synthesis of organic materials and polymers. Particularly, as use of lead in electrical and electronic circuits is regulated, silver is drawing attention as the material for metallic pattern and electrode in such emerging applications as low-resistance metal wirings, printed circuit boards (PCB), flexible printed circuits (FPC), antennas for radio frequency identification (RFID) tags, EMI shielding plasma display panels (PDP), thin film transistor liquid crystal displays (TFT-LCD), organic light emitting diodes (OLED), flexible displays and organic thin film transistors (OTFT).

Recently, researches on using silver instead of aluminum as the material for reflection film in reflection type or semi-transmission type LCDs, are actively in progress, as disclosed in Japanese Patent Laid-Open No. 2002-129259 (May 9, 2002), Japanese Patent Laid-Open No. 2004-176115 (Jun. 24, 2004) and Japanese Patent Laid-Open No. 2004-231982 (Aug. 19, 2004), because silver has better reflection and conduction properties than aluminum. Thus, there is a need for development of etching solutions for silver. Until now, etching of metal wiring or film is performed mostly using plasma or etching solutions. When conventional etching solutions for aluminum, which comprise phosphoric acid, nitric acid, acetic acid and water in general, are used for silver, the following problems occur: 1) other than silver, metal or metal oxide may be etched, too; 2) a superior pattern cannot be attained; 3) offensive odor makes working conditions unpleasant.

In general, etching of metal is accomplished by repeating the process of oxidation of metal surface by an oxidant to produce metal oxide, which is dissolved by an oxide dissolver. Currently, dissolution of silver is performed, in general, using a highly oxidative acid such as nitric acid or a mixture of an iron-based oxidant such as ferric sulfate and an inorganic acid such as phosphoric acid, sulfuric acid and acetic acid, as disclosed in Japanese Patent Laid-Open No. 2004-238656 (Aug. 26, 2004). Korean Patent Publication No. 2004-48374 (Jun. 9, 2004) presents an etching solution comprising a polyvalent carboxylic acid such as oxalic acid and succinic acid and an inorganic acid such as phosphoric acid and nitric acid. And, Korean Patent Publication No. 2004-440343 (Jul. 5, 2004) and Korean Patent Publication No. 2004-440344 (Jul. 5, 2004) present an etching solution comprising hydrogen peroxide, an organic acid and a pH adjuster or one comprising a trivalent iron compound as oxidant, nitric acid, acetic acid and an amine compound. But, use of strong inorganic acid results in corrosion, staining or reduced stability. U.S. Pat. No. 3,860,423 (Jan. 14, 1975) presents an etching solution for silver comprising ammonia and hydrogen peroxide. But, it shows slow etching rate in some instances. Therefore, development of a new etching solution is needed for etching of thin silver film or for superior pattern formation.

The present inventors ardently worked to solve these problems and found that when an oxidant is added to at least one ammonium compound represented by the formula (1), (2) or (3) below, the resultant solution can dissolve silver or silver alloy. Thus, the present invention provides an etching solution for silver or silver alloy, which is not non-corrosive and stable, while offering superior etching performance and enabling reuse.

DISCLOSURE

Technical Problem

An object of the present invention is to provide an etching solution for silver or silver alloy comprising at least one ammonium compound represented by the formula (1), (2) or (3) below and an oxidant.

Another object of the present invention is to provide an etching solution for silver or silver alloy being non-corrosive, offering superior stability and etching performance and enabling reuse.

Also another object of the present invention is to provide a method for preparing said etching solution for silver or silver alloy.

Technical Solution

To attain the objects, the present provides an etching solution for silver or silver alloy comprising at least one ammonium compound represented by the formula (1), (2) or (3) below and an oxidant:

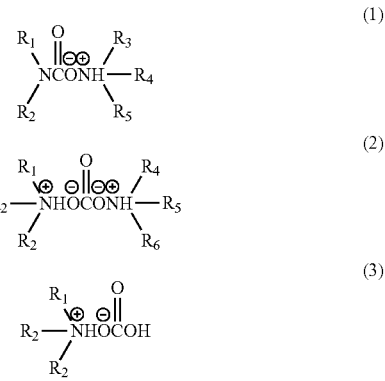

each of $R_1$, $R_2$, $R_3$, $R_4$, $R_5$ and $R_6$ is, independently, selected from hydrogen; substituted or unsubstituted $C_1$-$C_{30}$ aliphatic alkyl, alicyclic alkyl, aryl or aralkyl; a polymer compound; a heterocyclic compound; and derivatives thereof and $R_1$ and $R_2$ or $R_4$ and $R_5$ may be connected to form a ring.

However, the present invention is not particularly limited to this description.

Specific examples of $R_1$, $R_2$, $R_3$, $R_4$, $R_5$ and $R_6$ in the formula (1), (2) or (3) are hydrogen, methyl, ethyl, propyl, isopropyl, butyl, isobutyl, amyl, hexyl, ethylhexyl, heptyl, octyl, isooctyl, nonyl, decyl, dodecyl, hexadecyl, octadecyl, docodecyl, cyclopropyl, cyclopentyl, cyclohexyl, allyl, hydroxy, methoxy, hydroxyethyl, methoxyethyl, 2-hydroxy propyl, methoxypropyl, cyanoethyl, ethoxy, butoxy, hexyloxy, methoxyethoxyethyl, methoxyethoxyethoxyethyl, hexamethyleneimine, morpholine, piperidine, piperazine, ethylenediamine, propylenediamine, hexamethylenediamine, triethylenediamine, pyrrole, imidazole, pyridine, carboxymethyl, trimethoxysilylpropyl, triethoxysilylpropyl, phenyl, methoxyphenyl, cyanophenyl, phenoxy, tolyl, benzyl and derivatives thereof, polymer compounds such as polyallylamine and polyethyleneimine and derivatives thereof. But, the present invention is not particularly limited by these examples.

Specific examples of the ammonium carbamate compound represented by the formula (1) are ammonium carbamate, ethylammonium ethylcarbamate, isopropylammonium isopropylcarbamate, n-butylammonium n-butylcarbamate, isobutylammonium isobutylcarbamate, t-butylammonium t-butylcarbamate, 2-ethylhexylammonium 2-ethylhexylcarbamate, octadecylammonium octadecylcarbamate, 2-methoxyethylammonium 2-methoxyethylcarbamate, 2-cyanoethylammonium 2-cyanoethylcarbamate, dibutylammonium dibutylcarbamate, dioctadecylammonium dioctadecylcarbamate, methyldecylammonium methyldecylcarbamate, hexamethyleneiminium hexamethyleneiminecarbamate, morpholinium morpholinecarbamate, pyridinium ethylhexylcarbamate, triethylenediaminium isopropylcarbamate, benzylammonium benzylcarbamate, triethoxysilylpropylammonium triethoxysilylpropylcarbamate, etc. Specific examples of the ammonium carbonate compound represented by the formula (2) are ammonium carbonate, ethylammonium ethylcarbonate, isopropylammonium isopropylcarbonate, n-butylammonium n-butylcarbonate, isobutylammonium isobutylcarbonate, t-butylammonium t-butylcarbonate, 2-ethylhexylammonium 2-ethylhexylcarbonate, 2-methoxyethylammonium 2-methoxyethylcarbonate, 2-cyanoethylammonium 2-cyanoethylcarbonate, octadecylammonium octadecylcarbonate, dibutylammonium dibutylcarbonate, dioctadecylammonium dioctadecylcarbonate, methyldecylammonium methyldecylcarbonate, hexamethyleneiminium hexamethyleneiminecarbonate, morpholinium morpholinecarbonate, benzylammonium benzylcarbonate, triethoxysilylpropylammonium triethoxysilylpropylcarbonate, triethylenediaminium isopropylcarbonate, etc. Specific examples of the ammonium bicarbonate compound represented by the formula (3) are ammonium bicarbonate, isopropylammonium bicarbonate, t-butylammonium bicarbonate, 2-ethylhexylammonium bicarbonate, 2-methoxyethylammonium bicarbonate, 2-cyanoethylammonium bicarbonate, dioctadecylammonium bicarbonate, pyridinium bicarbonate, triethylenediaminium bicarbonate, etc.

The particular ammonium compound represented by the formula (1), (2) or (3) or the preparation method thereof needs not be restricted in particular. For example, the ammonium carbamate compound can be obtained from the reaction primary amine, secondary amine or tertiary amine with carbon dioxide and the ammonium carbonate compound and the ammonium bicarbonate compound can be obtained by addition of water, as disclosed in U.S. Pat. No. 4,542,214 (Sep. 17, 1985), *J. Am. Chem. Soc.*, 123, p 10393(2001) and *Langmuir*, 18, p 71247(2002). The reaction may be carried out under normal pressure or applied pressure with or without a solvent. In case a solvent is used, water, alcohols such as methanol, ethanol, isopropanol, butanol and ethanolamine, glycols such as ethylene glycol and glycerine, acetates such as ethyl acetate, butyl acetate and carbitol acetate, ethers such as diethyl ether, tetrahydrofuran and dioxane, ketones such as methyl ethyl ketone and acetone, hydrocarbon solvents such as hexane and heptane, aromatic solvents such as benzene and toluene, halogen-substituted solvents such as chloroform, methylene chloride and carbon tetrachloride or a mixture thereof may be used. The carbon dioxide may be bubbled in gas phase. Alternatively, solid dry ice may be used. It is also possible to carry out the reaction in the supercritical state. The ammonium carbamate, ammonium carbonate or ammonium bicarbonate and derivatives thereof used in the present invention may be prepared by any of the foregoing methods or any other known methods, as long as the final structure is the same. That is, solvent, reaction temperature, concentration, catalyst, etc. are not particularly restricted and preparation yield is not restricted, either.

It is also possible to use a composite ammonium compound prepared by reacting an amine compound with carbon dioxide and a triatomic molecule. For example, the adduct formed by reacting nitrogen dioxide, sulfur dioxide or carbon disulfide with such an amine compound as propylamine, decylamine and octadecyl amine may be added to an ammonium compound or the triatomic molecule may be added along with carbon dioxide during the reaction with amine to prepare the composite ammonium carbamate or carbonate compound, as presented in *Langmuir,* 19, p 1017(2003) and *Langmuir,* 19, p 8168(2003). Besides, the compound obtained by reacting an amine compound with such a boron compound as boraic acid and boronic or such ammonium compound as ammonium sulfamate, ammonium sulfate, ammonium hydrogen sulfate, ammonium sulfite or a mixture thereof may be used. In addition, excess amine compound or such additive as surfactant, wetting agent, etc. may be comprised in the etching solution.

Such prepared ammonium carbamate, ammonium carbonate or ammonium bicarbonate compound is reacted with oxidant to prepare an etching solution. For example, an oxidant may be reacted with at least one of the ammonium compound represented by the formula (1), (2) or (3) under normal pressure or applied pressure with or without a solvent. In case a solvent is used, water, alcohols such as methanol, ethanol, isopropanol, butanol and ethanolamine, glycols such as ethylene glycol and glycerine, acetates such as ethyl acetate, butyl acetate and carbitol acetate, ethers such as diethyl ether, tetrahydrofuran and dioxane, ketones such as methyl ethyl ketone and acetone, hydrocarbon solvents such as hexane and heptane, aromatic solvents such as benzene and toluene, halogen-substituted solvents such as chloroform, methylene chloride and carbon tetrachloride or a mixture thereof may be used.

Alternatively, a mixture solution comprising an oxidant and at least one amine compound may be reacted with carbon dioxide to obtain an etching solution. In this case, the reaction may be carried out under normal pressure or applied pressure with or without a solvent, as described above. However, the method for preparing the etching solution of the present invention needs not be particularly restricted. That is, any known method can be applied, as long as the objects of the present invention can be attained. For example, solvent, reaction temperature, concentration, additive, etc. are not particularly restricted and preparation yield is not restricted, either.

Specific examples of the oxidant, which is comprised in the etching solution for silver or silver alloy in accordance with the present invention as one of main components, are oxidative gases such as air, oxygen and ozone, peroxides such as hydrogen peroxide ($H_2O_2$), $Na_2O_2$, $KO_2$, $NaBO_3$, $K_2S_2O_8$, $(NH_4)_2S_2O_8$, $Na_2S_2O_8$, $H_2SO_5$, $KHSO_5$, $(CH_3)_3CO_2H$ and $(C_6H_5CO_2)_2$, peroxy acids such as $HCO_3H$, $CH_3CO_3H$, $CF_3CO_3H$, $C_6H_5CO_3H$ and m-$ClC_6H_5CO_3H$, oxidative inorganic acids such as nitric acid, sulfuric acid, $I_2$, $FeCl_3$, $Fe(NO_3)_3$, $Fe_2(SO_4)_3$, $K_3Fe(CN)_6$, $(NH_4)_2Fe(SO_4)_2$, $Ce(NH_4)_4(SO_4)_4$, $NaIO_4$, $KMnO_4$ and $K_2CrO_4$, metals and non-metal compounds. Such oxidant may be used alone or in combination. Differently from conventional etching solutions, which are mainly composed of inorganic acids and, thus, are strongly acidic, the etching solution of the present invention is neutral to mild basic. Consequently, it is non-corrosive and stable against light or heat.

Examples of metals that can form alloy along with silver are transition metals such as Au, Cu, Ni, Co, Pd, Pt, Ti, V, Mn, Fe, Cr, Zr, Nb, Mo, W, Ru, Cd, Ta, Re, Os and Ir, metals or non-metals such as Al, Ga, Ge, In, Sn, Sb, Pb, Bi, Si, As and Hg, lanthanides such as Sm and Eu, actinides such as Ac and Th and alkaline earth metals such as Mg, Ca, Sr and Ba. Typically, palladium, copper, gold, ruthenium, tin, neodymium, bismuth, silicon, germanium, magnesium, vanadium or a mixture thereof may be used to obtain a silver alloy. The content of the metal comprised in the alloy or the amount of the oxidant needs not be particularly restricted, as long as the objects of the present invention are attained. And, the silver or silver alloy to be etched may be in any form, including thin film, foil, wire, particle, etc.

Etching of silver or silver alloy using the etching solution may be carried out by heating, electrolysis, ultrasonification, microwave treatment, high frequency treatment, plasma treatment, IR treatment, UV treatment, etc. After etching of silver or silver alloy, the etching solution may be collected for reuse. The collected etching solution may be used, for example, to prepare metal wiring or conductive ink or paste for patterning or, through reduction or heat treatment, to prepare high-purity silver, silver compounds or alloys, as presented in Korean Patent Application No. 2005-11475, Korean Patent Application No. 2005-11478, Korean Patent Application No. 2005-18364 도 and Korean Patent Application No. 2005-23013.

The etching solution of the present invention can attain the objects of the present invention as long as it comprises an ammonium compound and an oxidant. Specific composition will vary depending on the etching rate and etching amount. Also, a solvent may or may not be used, without particular restriction.

Advantageous Effects

The present invention provides an etching solution for silver or silver alloy which comprises at least one ammonium carbamate or ammonium carbonate compound represented by the formula (1), (2) or (3) and an oxidant.

The etching solution of the present invention is non-corrosive and stable while offering superior etching performance and enabling reuse. Thus, it can be widely utilized as the etching solution for silver or silver alloy used in electrodes, wirings, reflection films, semi-transmission films, etc. in such applications as EMI shielding materials, conductive adhesives, low-resistance metal wirings, printed circuit boards (PCB), flexible printed circuits (FPC), antennas for radio frequency identification (RFID) tags, solar cells, secondary cells, fuel cells, plasma display panels (PDP), thin film transistor liquid crystal displays (TFT-LCD), organic light emitting diodes (OLED), flexible displays and organic thin film transistors (OTFT) and the etching solution.

BEST MODE

Hereinafter, the embodiments of the present invention will be described in detail with reference to examples. However, it will be appreciated that those skilled in the art, in consideration of this disclosure, may make modifications and improvements within the spirit and scope of the present invention.

Example 1

In a 50.00 mL flask equipped with a stirrer, 2.26 g (13.93 mmol) of isopropylammonium isopropylcarbamate was dissolved in 10.00 mL of methanol and 1.58 g (23.23 mmol) of 50.00 wt % aqueous hydrogen peroxide solution was slowly added to obtain a colorless, transparent solution. Subsequently, metallic silver was slowly added at room temperature until it was not dissolved any more. As the reaction proceeded, the reaction mixture turned into a gray slurry, and then into a colorless, transparent solution, again. The total amount of consumed silver was 0.50 g (4.64 mmol).

Comparative Example 1

A colorless, transparent solution was obtained in the same manner as in Example 1, except that 1.74 g (13.93 mmol) of 28.00 wt % aqueous ammonia solution was used instead of isopropylammonium isopropylcarbamate. The total amount of consumed silver was 0.11 g (1.02 mmol).

Comparative Example 2

In a 50.00 mL flask equipped with a stirrer, 8.55 g of 85.00 wt % phosphoric acid (85.50 wt % based on the total weight), 0.53 g of 60.00 wt % nitric acid (5.30 wt % based on the total weight), 0.65 g of 99.00 wt % acetic acid (6.50 wt % based on the total weight) and 0.27 g of water (2.70 wt % based on the total weight) were added to obtain a colorless, transparent solution. Subsequently, metallic silver was slowly added at room temperature until it was not dissolved any more. As the reaction proceeded, the reaction mixture turned into a gray slurry, a yellow-green solution and then into a white, semi-transparent solution. The total amount of consumed silver was 0.23 g (2.13 mmol).

Example 2

A colorless, transparent solution was obtained in the same manner as in Example 1, except that 4.52 g (27.86 mmol) of isopropylammonium isopropylcarbamate was used. The total amount of consumed silver was 0.57 g (5.28 mmol).

Example 3

A colorless, transparent solution was obtained in the same manner as in Example 1, except that 3.16 g (46.46 mmol) of 50.00 wt % hydrogen peroxide aqueous solution was used. The total amount of consumed silver was 0.58 g (5.38 mmol).

Example 4

A colorless, transparent solution was obtained in the same manner as in Example 1, except that a mixture of 5.00 mL of methanol and 5.00 mL of water was used instead of 10.00 mL of methanol. The total amount of consumed silver was 0.38 g (3.52 mmol).

Example 5

A colorless, transparent solution was obtained in the same manner as in Example 1, except that 2.51 g (13.93 mmol) of isopropylammonium isopropylcarbonate was used instead of isopropylammonium isopropylcarbamate. The total amount of consumed silver was 0.31 g (2.83 mmol).

Example 6

A colorless, transparent solution was obtained in the same manner as in Example 1, except that 1.69 g (13.93 mmol) of isopropylammonium bicarbonate was used instead of isopropylammonium isopropylcarbamate. The total amount of consumed silver was 0.32 g (2.97 mmol).

Example 7

A colorless, transparent solution was obtained in the same manner as in Example 1, except that 4.21 g (13.93 mmol) of 2-ethylhexylammonium 2-ethylhexylcarbamate was used instead of isopropylammonium isopropylcarbamate. The total amount of consumed silver was 0.15 g (1.39 mmol).

Example 8

A colorless, transparent solution was obtained in the same manner as in Example 1, except that 2.71 g (13.93 mmol) of 2-methoxyethylammonium 2-methoxyethylcarbamate was used instead of isopropylammonium isopropylcarbamate. The total amount of consumed silver was 0.28 g (2.60 mmol).

Example 9

A colorless, transparent solution was obtained in the same manner as in Example 1, except that 1.91 g (13.93 mmol) of 2-methoxyethylammonium bicarbonate was used instead of isopropylammonium isopropylcarbamate. The total amount of consumed silver was 0.05 g (0.46 mmol).

Example 10

A colorless, transparent solution was obtained in the same manner as in Example 1, except that 1.09 g (13.93 mmol) of ammonium carbamate was used instead of isopropylammonium isopropylcarbamate. The total amount of consumed silver was 0.22 g (2.04 mmol).

Example 11

A colorless, transparent solution was obtained in the same manner as in Example 1, except that 1.26 g (6.97 mmol) of isopropylammonium isopropylcarbonate and 0.80 g (6.97 mmol) of ammonium sulfamate were used instead of isopropylammonium isopropylcarbamate and that the same amount of water was used instead of methanol. The total amount of consumed silver was 0.09 g (0.84 mmol).

Example 12

A colorless, transparent solution was obtained in the same manner as in Example 1, except that 1.26 g (18.56 mmol) of 50.00 wt % hydrogen peroxide aqueous solution and 0.49 g (4.64 mmol) of 60.00 wt % nitric acid were used instead of 1.58 g of 50.00 wt % hydrogen peroxide aqueous solution. The total amount of consumed silver was 0.19 g (1.72 mmol).

Example 13

A colorless, transparent solution was obtained in the same manner as in Example 1, except that 10.00 mL of water was used instead of methanol. The total amount of consumed silver was 0.08 g (0.76 mmol).

Example 14

A colorless, transparent solution was obtained in the same manner as in Example 1, except that silver-palladium alloy (palladium content=1.00%) was added instead of metallic silver. The total amount of consumed silver-palladium alloy was 0.48 g.

Example 15

In a 50.00 mL flask equipped with a stirrer, 1.65 g (9.28 mmol) of 2:1 (molar ratio) mixture of isopropylamine and boronic acid was dissolved in 11.65 mL of methanol and 1.58 g (23.23 mmol) of 50.00 wt % aqueous hydrogen peroxide solution was slowly added to obtain a colorless, transparent solution. Subsequently, metallic silver was slowly added at room temperature until it was not dissolved any more. As the reaction proceeded, the reaction mixture turned into a gray slurry, and then into a colorless, transparent solution, again. The total amount of consumed silver was 0.22 g (2.04 mmol).

INDUSTRIAL APPLICABILITY

The etching solution of the present invention is non-corrosive and stable while offering superior etching performance and enabling reuse. Thus, it can be widely utilized as the etching solution for silver or silver alloy used in electrodes, wirings, reflection films, semi-transmission films, etc. in such applications as EMI shielding materials, conductive adhesives, low-resistance metal wirings, printed circuit boards (PCB), flexible printed circuits (FPC), antennas for radio frequency identification (RFID) tags, solar cells, secondary cells, fuel cells, plasma display panels (PDP), thin film transistor liquid crystal displays (TFT-LCD), organic light emitting diodes (OLED), flexible displays and organic thin film transistors (OTFT) and the etching solution.

Those skilled in the art will appreciate that the concepts and specific embodiments disclosed in the foregoing description may be readily utilized as a basis for modifying or designing other embodiments for carrying out the same purposes of the present invention. Those skilled in the art will also appreciate that such equivalent embodiments do not depart from the spirit and scope of the present invention as set forth in the appended claims.

The invention claimed is:
1. An etching solution for silver or silver alloy consisting of ammonium carbamate, an oxidant and a solvent.
2. The etching solution for silver or silver alloy as set forth in claim 1, wherein the oxidant consists of at least one component selected from oxidative gas, peroxide, peroxy acid, oxidative inorganic acid, oxidative metal compound and oxidative non-metal compound.
3. The etching solution for silver or silver alloy as set forth in claim 2, wherein the oxidant consists of at least one component selected from air, oxygen, ozone, hydrogen peroxide, $Na_2O_2$, $KO_2$, $NaBO_3$, $K_2S_2O_8$, $(NH_4)_2S_2O_8$, $Na_2S_2O_8$,

$H_2SO_5$, $KHSO_5$, $(CH_3)_3CO_2H$, $(C_6H_5CO_2)_2$, $HCO_3H$, $CH_3CO_3H$, $CF_3CO_3H$, $C_6H_5CO_3H$, m-$ClC_6H_5CO_3H$, nitric acid, sulfuric acid, $I_2$, $FeCl_3$, $Fe(NO_3)_3$, $Fe_2(SO_4)_3$, $K_3Fe(CN)_6$, $(NH_4)_2Fe(SO_4)_2$, $Ce(NH_4)_4(SO_4)_4$, $NaIO_4$, $KMnO4$ and $K_2CrO_4$.

4. The etching solution for silver or silver alloy as set forth in claim 1, wherein the solvent consists of at least one component selected from water, alcohol, glycol, acetate, ether, ketone, aromatic compound and halogenated hydrocarbon.

5. The etching solution for silver or silver alloy as set forth in claim 4, wherein the solvent is at least one component selected from water, methanol, ethanol, isopropanol, 1-methoxypropanol, butanol, ethylhexyl alcohol, terpineol, ethylene glycol, glycerine, ethyl acetate, butyl acetate, methoxypropyl acetate, carbitol acetate, ethylcarbitol acetate, methylcellosolve, butylcellosolve, diethyl ether, tetrahydrofuran, dioxane, methyl ethyl ketone, acetone, dimethylformamide, 1-methyl-2-pyrrolidone, dimethylsulfoxide, hexane, heptane, dodecane, paraffin oil, mineral spirit, benzene, toluene, xylene, chloroform, methylene chloride, carbon tetrachloride and acetonitrile.

6. An etching solution for silver or silver alloy consisting of at least one ammonium compound represented by the formula (1), (2) or (3) below, an oxidant, a solvent, and a compound obtained by reacting an amine compound selected from propylamine, isopropyl amine, decylamine and octadecyl amine with a boron compound selected from boraic acid and boronic acid:

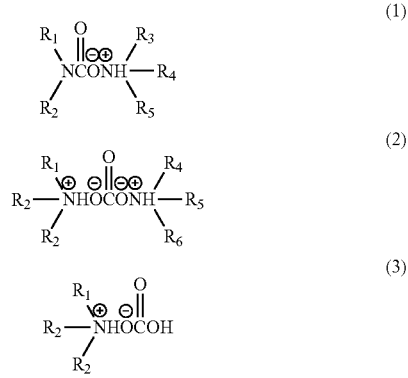

each of $R_1$, $R_2$, $R_3$, $R_4$, $R_5$ and $R_6$ is, independently, selected from hydrogen; substituted or unsubstituted $C_1$-$C_{30}$ aliphatic alkyl, alicyclic alkyl, aryl or aralkyl; a polymer compound; a heterocyclic compound; and derivatives thereof.

7. The etching solution for silver or silver alloy as set forth in claim 6, wherein each of $R_1$, $R_2$, $R_3$, $R_4$, $R_5$ and $R_6$ is, independently, selected from methyl, ethyl, propyl, isopropyl, butyl, isobutyl, amyl, hexyl, ethylhexyl, heptyl, octyl, isooctyl, nonyl, decyl, dodecyl, hexadecyl, octadecyl, docodecyl, cyclopropyl, cyclopentyl, cyclohexyl, allyl, hydroxy, methoxy, methoxyethyl, methoxypropyl, cyanoethyl, ethoxy, butoxy, hexyloxy, methoxyethoxyethyl, methoxyethoxyethoxyethyl, hexamethyleneimine, morpholine, piperidine, piperazine, ethylenediamine, propylenediamine, hexamethylenediamine, triethylenediamine, pyrrole, imidazole, pyridine, carboxymethyl, trimethoxysilylpropyl, triethoxysilylpropyl, phenyl, methoxyphenyl, cyanophenyl, phenoxy, tolyl, benzyl, polyallylamine and polyethyleneamine.

8. The etching solution for silver or silver alloy as set forth in claim 6, wherein the ammonium carbamate compound represented by the formula (1) is selected from ammonium carbamate, ethylammonium ethylcarbamate, isopropylammonium isopropylcarbamate, n-butylammonium n-butylcarbamate, isobutylammonium isobutylcarbamate, t-butylammonium t-butylcarbamate, 2-ethylhexylammonium 2-ethylhexylcarbamate, octadecylammonium octadecylcarbamate, 2-methoxyethylammonium 2-methoxyethylcarbamate, 2-cyanoethylammonium 2-cyanoethylcarbamate, dibutylammonium dibutylcarbamate, dioctadecylammonium dioctadecylcarbamate, methyldecylammonium methyldecylcarbamate, hexamethyleneiminium hexamethyleneiminecarbamate, morpholinium morpholinecarbamate, pyridinium ethylhexylcarbamate, triethylenediaminium isopropylcarbamate, benzylammonium benzylcarbamate and triethoxysilylpropylammonium triethoxysilylpropylcarbamate.

9. The etching solution for silver or silver alloy as set forth in claim 6, wherein the ammonium carbonate compound represented by the formula (2) is selected from ammonium carbonate, ethylammonium ethylcarbonate, isopropylammonium isopropylcarbonate, n-butylammonium n-butylcarbonate, isobutylammonium isobutylcarbonate, t-butylammonium t-butylcarbonate, 2-ethylhexylammonium 2-ethylhexylcarbonate, 2-methoxyethylammonium 2-methoxyethylcarbonate, 2-cyanoethylammonium 2-cyanoethylcarbonate, octadecylammonium octadecylcarbonate, dibutylammonium dibutylcarbonate, dioctadecylammonium dioctadecylcarbonate, methyldecylammonium methyldecylcarbonate, hexamethyleneiminium hexamethyleneiminecarbonate, morpholinium morpholinecarbonate, benzylammonium benzylcarbonate, triethoxysilylpropylammonium triethoxysilylpropylcarbonate and triethylenediaminium isopropylcarbonate.

10. The etching solution for silver or silver alloy as set forth in claim 6, wherein the ammonium bicarbonate compound represented by the formula (3) is selected from ammonium bicarbonate, isopropylammonium bicarbonate, t-butylammonium bicarbonate, 2-ethylhexylammonium bicarbonate, 2-methoxyethylammonium bicarbonate, 2-cyanoethylammonium bicarbonate, dioctadecylammonium bicarbonate, pyridinium bicarbonate and triethylenediaminium bicarbonate.

11. The etching solution for silver or silver alloy as set forth in claim 6, wherein the oxidant consists of at least one component selected from oxidative gas, peroxide, peroxy acid, oxidative inorganic acid, oxidative metal compound and oxidative non-metal compound.

12. The etching solution for silver or silver alloy as set forth in claim 11, wherein the oxidant consists of at least one component selected from air, oxygen, ozone, hydrogen peroxide, $Na_2O_2$, $KO_2$, $NaBO_3$, $K_2S_2O_8$, $(NH_4)_2S_2O_8$, $Na_2S_2O_8$, $H_2SO_5$, $KHSO_5$, $(CH_3)_3CO_2H$, $(C_6H_5CO_2)_2$, $HCO_3H$, $CH_3CO_3H$, $CF_3CO_3H$, $C_6H_5CO_3H$, m-$ClC_6H_5CO_3H$, nitric acid, sulfuric acid, $I_2$, $FeCl_3$, $Fe(NO_3)_3$, $Fe_2(SO_4)_3$, $K_3Fe(CN)_6$, $(NH_4)_2Fe(SO_4)_2$, $Ce(NH_4)_4(SO_4)_4$, $NaIO_4$, $KMnO_4$ and $K_2CrO_4$.

13. The etching solution for silver or silver alloy as set forth in claim 6, wherein the solvent consists of at least one component selected from water, alcohol, glycol, acetate, ether, ketone, aromatic compound and halogenated hydrocarbon.

14. The etching solution for silver or silver alloy as set forth in claim 13, wherein the solvent is at least one component selected from water, methanol, ethanol, isopropanol, 1-methoxypropanol, butanol, ethylhexyl alcohol, terpineol, ethylene glycol, glycerine, ethyl acetate, butyl acetate, methoxypropyl acetate, carbitol acetate, ethylcarbitol acetate, methylcellosolve, butylcellosolve, diethyl ether, tetrahydrofuran, dioxane, methyl ethyl ketone, acetone, dimethylformamide, 1-methyl-2-pyrrolidone, dimethylsulfoxide, hexane, heptane, dodecane, paraffin oil, mineral spirit, benzene, toluene, xylene, chloroform, methylene chloride, carbon tetrachloride and acetonitrile.

15. An etching solution for silver or silver alloy consisting of at least one ammonium compound represented by the formula (1), (2) or (3) below, an oxidant, a solvent, and an additive selected from ammonium sulfamate, ammonium sulfate, ammonium hydrogen sulfate and ammonium sulfite:

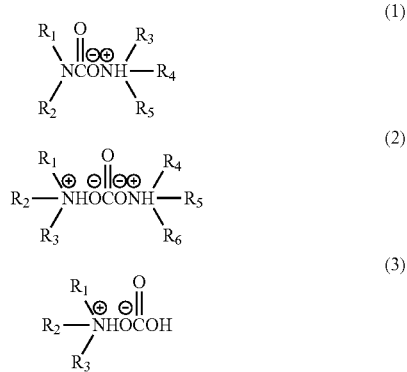

each of $R_1$, $R_2$, $R_3$, $R_4$, $R_5$ and $R_6$ is, independently, selected from hydrogen;
substituted or unsubstituted $C_1$-$C_{30}$ aliphatic alkyl, alicyclic alkyl, aryl or aralkyl; a polymer compound; a heterocyclic compound; and derivatives thereof.

16. The etching solution for silver or silver alloy as set forth in claim 15, wherein each of $R_1$, $R_2$, $R_3$, $R_4$, $R_5$ and $R_6$ is, independently, selected from methyl, ethyl, propyl, isopropyl, butyl, isobutyl, amyl, hexyl, ethylhexyl, heptyl, octyl, isooctyl, nonyl, decyl, dodecyl, hexadecyl, octadecyl, docodecyl, cyclopropyl, cyclopentyl, cyclohexyl, allyl, hydroxy, methoxy, methoxyethyl, methoxypropyl, cyanoethyl, ethoxy, butoxy, hexyloxy, methoxyethoxyethyl, methoxyethoxyethoxyethyl, hexamethyleneimine, morpholine, piperidine, piperazine, ethylenediamine, propylenediamine, hexamethylenediamine, triethylenediamine, pyrrole, imidazole, pyridine, carboxymethyl, trimethoxysilylpropyl, triethoxysilylpropyl, phenyl, methoxyphenyl, cyanophenyl, phenoxy, tolyl, benzyl, polyallylamine and polyethyleneamine.

17. The etching solution for silver or silver alloy as set forth in claim 15, wherein the ammonium carbamate compound represented by the formula (1) is selected from ammonium carbamate, ethylammonium ethylcarbamate, isopropylammonium isopropylcarbamate, n-butylammonium n-butylcarbamate, isobutylammonium isobutylcarbamate, t-butylammonium t-butylcarbamate, 2-ethylhexylammonium 2-ethylhexylcarbamate, octadecylammonium octadecylcarbamate, 2-methoxyethylammonium 2-methoxyethylcarbamate, 2-cyanoethylammonium 2-cyanoethylcarbamate, dibutylammonium dibutylcarbamate, dioctadecylammonium dioctadecylcarbamate, methyldecylammonium methyldecylcarbamate, hexamethyleneiminium hexamethyleneiminecarbamate, morpholinium morpholinecarbamate, pyridinium ethylhexylcarbamate, triethylenediaminium isopropylcarbamate, benzylammonium benzylcarbamate and triethoxysilylpropylammonium triethoxysilylpropylcarbamate.

18. The etching solution for silver or silver alloy as set forth in claim 15, wherein the ammonium carbonate compound represented by the formula (2) is selected from ammonium carbonate, ethylammonium ethylcarbonate, isopropylammonium isopropylcarbonate, n-butylammonium n-butylcarbonate, isobutylammonium isobutylcarbonate, t-butylammonium t-butylcarbonate, 2-ethylhexylammonium 2-ethylhexylcarbonate, 2-methoxyethylammonium 2-methoxyethylcarbonate, 2-cyanoethylammonium 2-cyanoethylcarbonate, octadecylammonium octadecylcarbonate, dibutylammonium dibutylcarbonate, dioctadecylammonium dioctadecylcarbonate, methyldecylammonium methyldecylcarbonate, hexamethyleneiminium hexamethyleneiminecarbonate, morpholinium morpholinecarbonate, benzylammonium benzylcarbonate, triethoxysilylpropylammonium triethoxysilylpropylcarbonate and triethylenediaminium isopropylcarbonate.

19. The etching solution for silver or silver alloy as set forth in claim 15, wherein the ammonium bicarbonate compound represented by the formula (3) is selected from ammonium bicarbonate, isopropylammonium bicarbonate, t-butylammonium bicarbonate, 2-ethylhexylammonium bicarbonate, 2-methoxyethylammonium bicarbonate, 2-cyanoethylammonium bicarbonate, dioctadecylammonium bicarbonate, pyridinium bicarbonate and triethylenediaminium bicarbonate.

20. The etching solution for silver or silver alloy as set forth in claim 15, wherein the oxidant consists of at least one component selected from oxidative gas, peroxide, peroxy acid, oxidative inorganic acid, oxidative metal compound and oxidative non-metal compound.

21. The etching solution for silver or silver alloy as set forth in claim 20, wherein the oxidant consists of at least one component selected from air, oxygen, ozone, hydrogen peroxide, $Na_2O_2$, $KO_2$, $NaBO_3$, $K_2S_2O_8$, $(NH_4)_2S_2O_8$, $Na_2S_2O_8$, $H_2SO_5$, $KHSO_5$, $(CH_3)_3CO_2H$, $(C_6H_5CO_2)_2$, $HCO_3H$, $CH_3CO_3H$, $CF_3CO_3H$, $C_6H_5CO_3H$, m-$ClC_6H_5CO_3H$, nitric acid, sulfuric acid, $I_2$, $FeCl_3$, $Fe(NO_3)_3$, $Fe_2(SO_4)_3$, $K_3Fe(CN)_6$, $(NH_4)_2Fe(SO_4)_2$, $Ce(NH_4)_4(SO_4)_4$, $NaIO_4$, $KMnO_4$ and $K_2CrO_4$.

22. The etching solution for silver or silver alloy as set forth in claim 15, wherein the solvent consists of at least one component selected from water, alcohol, glycol, acetate, ether, ketone, aromatic compound and halogenated hydrocarbon.

23. The etching solution for silver or silver alloy as set forth in claim 22, wherein the solvent is at least one component selected from water, methanol, ethanol, isopropanol, 1-methoxypropanol, butanol, ethylhexyl alcohol, terpineol, ethylene glycol, glycerine, ethyl acetate, butyl acetate, methoxypropyl acetate, carbitol acetate, ethylcarbitol acetate, methylcellosolve, butylcellosolve, diethyl ether, tetrahydrofuran, dioxane, methyl ethyl ketone, acetone, dimethylformamide, 1-methyl-2-pyrrolidone, dimethylsulfoxide, hexane, heptane, dodecane, paraffin oil, mineral spirit, benzene, toluene, xylene, chloroform, methylene chloride, carbon tetrachloride and acetonitrile.

\* \* \* \* \*